United States Patent [19]
Tu

[11] Patent Number: 6,128,418
[45] Date of Patent: Oct. 3, 2000

[54] BUILT-IN SCANNER

[75] Inventor: Hsin-Hung Tu, Hsinchu, Taiwan

[73] Assignee: Mustek System Inc., Hsinchu, Taiwan

[21] Appl. No.: 09/169,845

[22] Filed: Oct. 9, 1998

[30] Foreign Application Priority Data

Oct. 3, 1997 [TW] Taiwan ................................. 86216757

[51] Int. Cl.$^7$ ....................................................... G06K 7/00
[52] U.S. Cl. ........................................... 382/312; 358/475
[58] Field of Search ........................... 382/312; 358/475, 358/474, 498

[56] References Cited

U.S. PATENT DOCUMENTS 5,844,695  12/1998  Suzuki ..................................... 358/475
5,850,296  12/1998  Wang et al. ............................. 358/474
6,031,640  2/2000  Chou ....................................... 358/498

*Primary Examiner*—Jose L. Couso
*Assistant Examiner*—Anh Hong Do
*Attorney, Agent, or Firm*—W. Wayne Liauh

[57] ABSTRACT

A built-in scanner for computers includes a transport portion and a case. The case is mounted in a computer, and the transport portion is extractive. There is only one way to feed document sheets, the document sheet is thus smoothly and fed through the built-in scanner without vibration. As the transport portion is engaged into the case, the built-in scanner is completely assembled. The transport portion of the built-in scanner can transport document sheets one by one for scanning. In addition, as the document sheet is jammed, the transport portion of the built-in scanner can be extracted for repairing.

19 Claims, 9 Drawing Sheets

BUILT-IN SCANNER

BACKGROUND OF THE INVENTION

1. Field of the Invention

This invention relates to a scanner, especially to a built-in scanner for computers.

2. Description of Related Art

A built-in scanner is a compact scanner built inside a computer. There are many advantages for a computer with a built-in scanner such as: it is compact and easily portable. Since more and more computer users buy scanners as common accouterment, built-in scanners are greatly required. The built-in scanner of the prior art has a document tray whose function likes the CD-ROM player's tray of a computer. The work cycle of the built-in scanner of the prior art is described as follows. When users want to scan a document sheet, the document tray is pulled out for users to put a document sheet. Then, the document tray with the document sheet is moved inward for scanning. As the document sheet is completely scanned, the document tray is pulled out again for users to take the scanned document sheet out.

A major problem of the prior art is that since the document tray with the document sheet is moved forward and backward when the document sheet is scanned, the motion vibration degrades the scan quality.

Another problem of the prior art is that only one document sheet can be scanned in one work cycle.

SUMMARY OF THE INVENTION

A major objective of the invention is to provide a built-in scanner without the above problems of the prior art.

Another objective of the invention is to supply a built-in scanner with module design for easily repairing the scanner as the document sheet jams.

With the problems of the prior art in mind, the built-in scanner of the invention comprises a case and a transport portion. The case is mounted in a computer, and the transport portion is extractive and separable. There is only one way to feed document sheets, the document sheet is thus smoothly and one-way fed through the built-in scanner without vibration. Consequently, the scanning quality is good. As the transport portion is engaged into the case, the built-in scanner is completely assembled. The transport portion of the built-in scanner can transport document sheets one by one for scanning. In addition, as the document sheet is jammed, the transport portion of the built-in scanner can be extracted for repairing.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIG. 2-1 is the cross-section view of the transport portion of the first embodiment shown in FIG. 1;

FIG. 2-2 is the cross-section view of the case of the first embodiment shown in FIG. 1;

FIG. 2-3 is the cross-section view of the assembled built-in scanner of the first embodiment shown in FIG. 1;

FIG. 2-4 is the cross-section view of the document sheet entrance of the first embodiment shown in FIG. 1;

FIG. 3-1 is the cross-section view of the transport portion of the second embodiment;

FIG. 3-2 is the cross-section view of the case of the second embodiment;

FIG. 3-3 is the cross-section view of the assembled built-in scanner of the second embodiment;

FIG. 4-1 is the cross-section view of the transport portion of the third embodiment;

FIG. 4-2 is the cross-section view of the case of the third embodiment;

FIG. 4-3 is the cross-section view of the assembled built-in scanner of the third embodiment;

FIG. 5-1 is the perspective view of a belt of the invention;

FIG. 5-2 is the perspective view of another belt of the invention;

FIG. 6-1 is the cross-section view of a document exit of the invention; and

FIG. 6-2 is the cross-section view of another document exit of the invention.

DETAILED DESCRIPTION OF THE INVENTION

Figure 1:
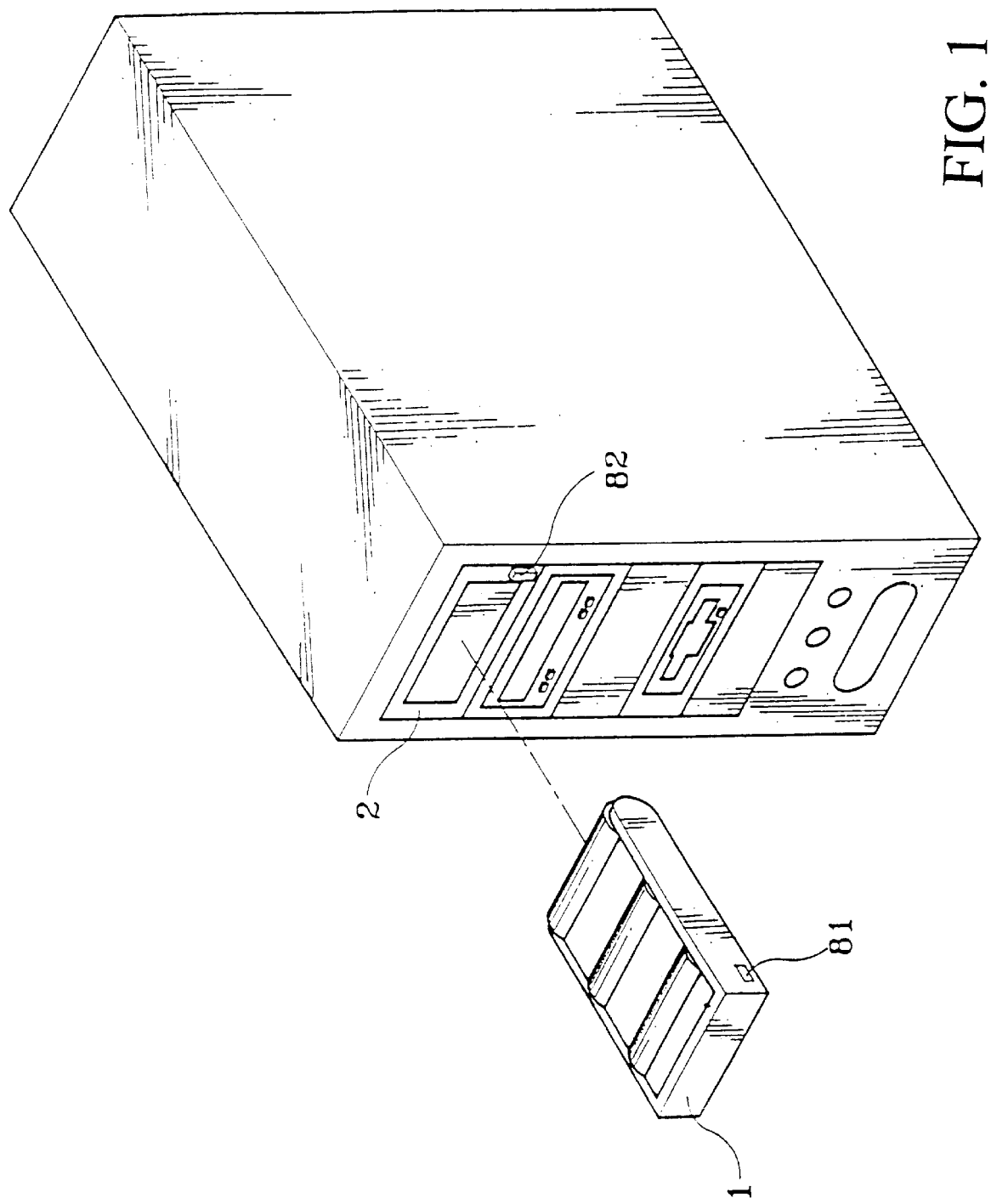
FIG. 1 is the perspective view of a computer with a built-in scanner of the invention.

Please refer to FIG. 1, which is the perspective view of a computer with a built-in of the invention. The built-in scanner of the invention includes a transport portion 1 and a case 2, where the case 2 is mounted in the computer and the transport portion 1 is extractive. In the transport portion 1, there is only one way to feed the document sheets. It reduces the motion vibration caused by feeding document sheet forward and backward. There are a lock recess 81 and a lock switch 82 on the transport portion 1 and the case 2, respectively. When the transport portion 1 is inserted into the case 2, the lock recess 81 and the lock switch 82 are tightly engaged. Hence, the built-in scanner is completely assembled. Besides, the entrance 91 and exit 92 (shown in FIG. 2-3) of document sheets are consequently formed at the side of the built-in scanner facing to the users.

The First Embodiment

Figures 1, 2:
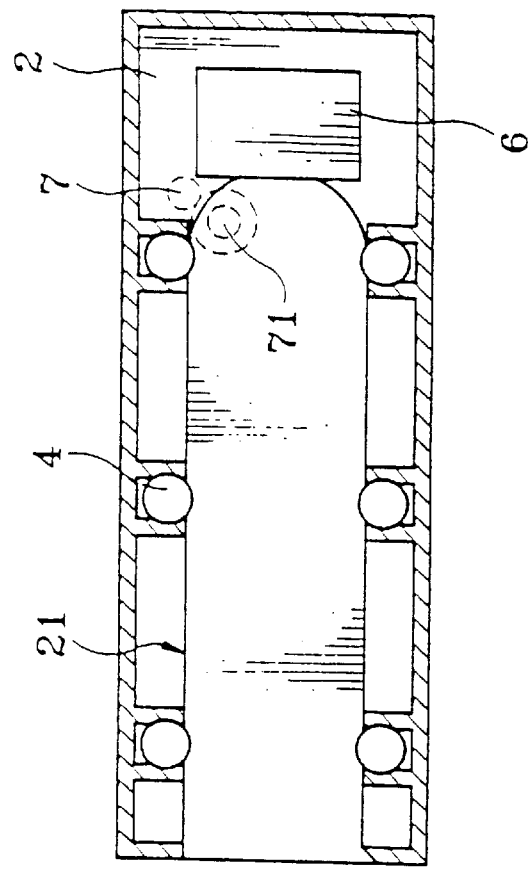
Figure 2:
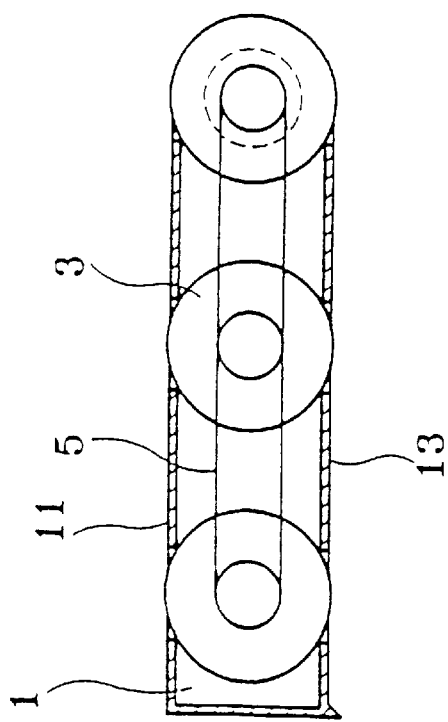

Please refer to FIG. 2-1, which is the cross-section view of the transport portion of the first embodiment according to the invention. The transport portion 1 includes a framework 11 and a plurality of first rolling devices 3. The framework 11 has some openings at its top, bottom, and right sides, and parts of the first rolling devices 3 are beetled from the top-side and bottom-side openings of the framework 11. In addition, one of the first rolling devices 3 is beetled from the right-side opening of the framework 11. A belt 5 connects and rotates the axles of the first rolling devices 3 for transporting document sheets.

Please refer to FIG. 2-2, which is the cross-section view of the case of the first embodiment. The case 2 includes a scan unit and a guide part 21. Inside the case 2, there are an inner space and an opening for engaging with the transport portion 1. The scan unit is used to capture the image of a document sheet. In this embodiment, the scan unit is a contact image sensor (CIS) 6. The guide part 21 comprises a driving means 7, a plurality of driven rollers 4, and a driving wheel 71. Parts of the driven rollers 4 are beetled to the inner space of the case 2. The driving means 7 is used to drive the driving wheels 71, and the driving wheel 71 is used to rotate the first rolling devices 3 of the transport portion 1.

Figures 2, 3, 4:
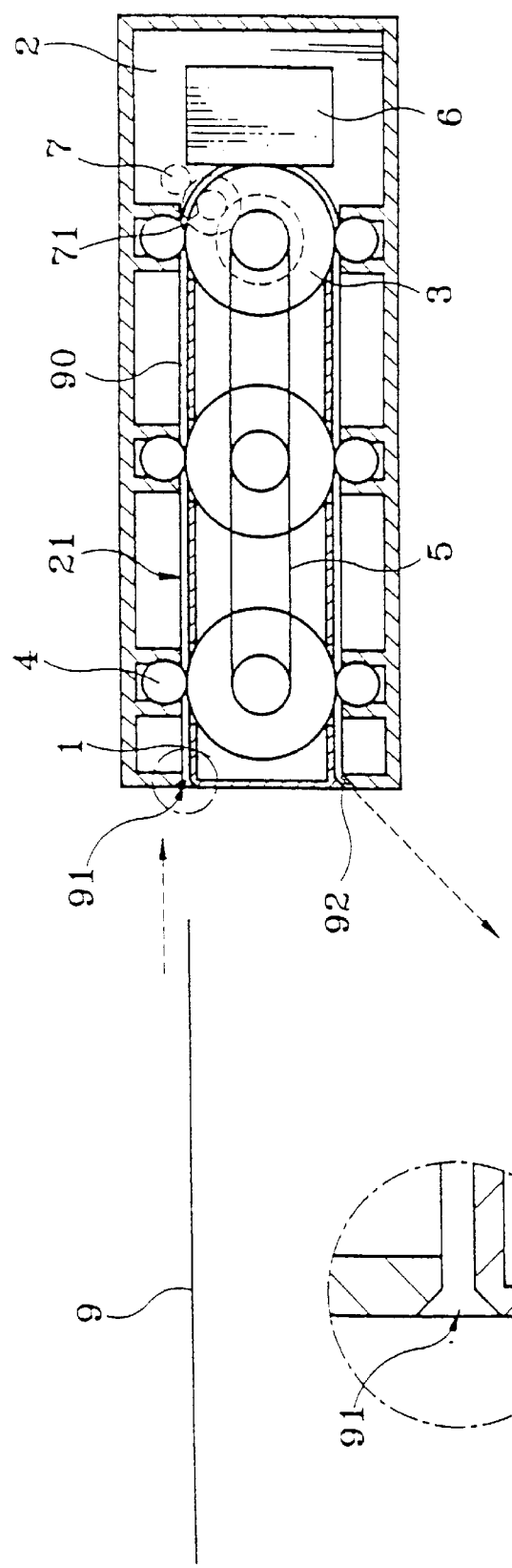
Figures 1, 2, 3:
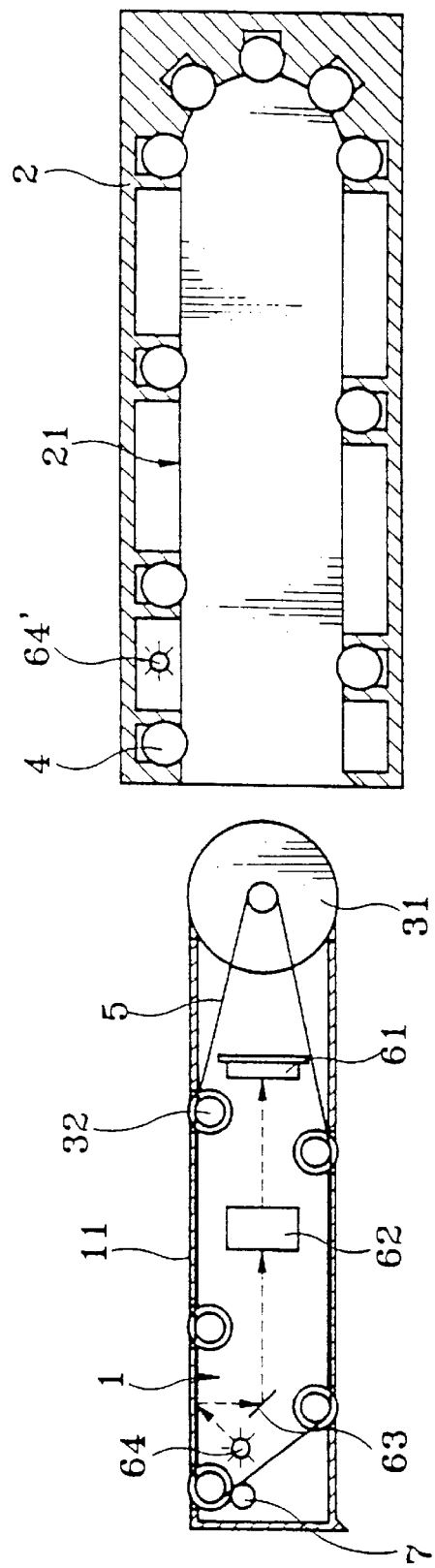
Figure 3:
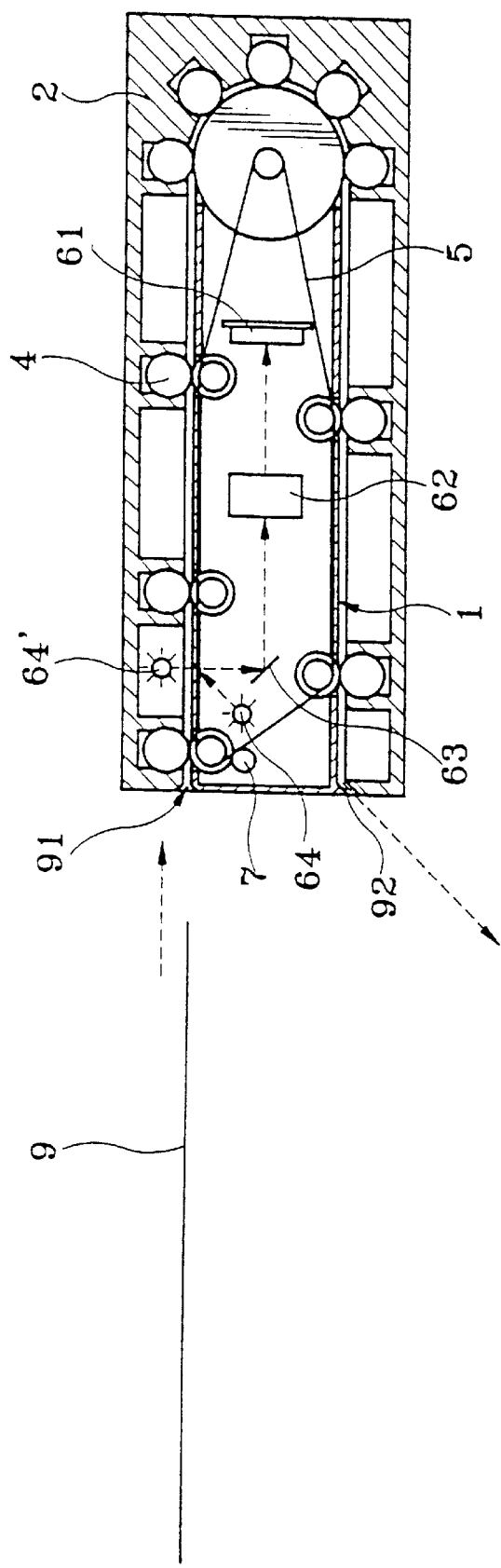
Figures 2, 4:
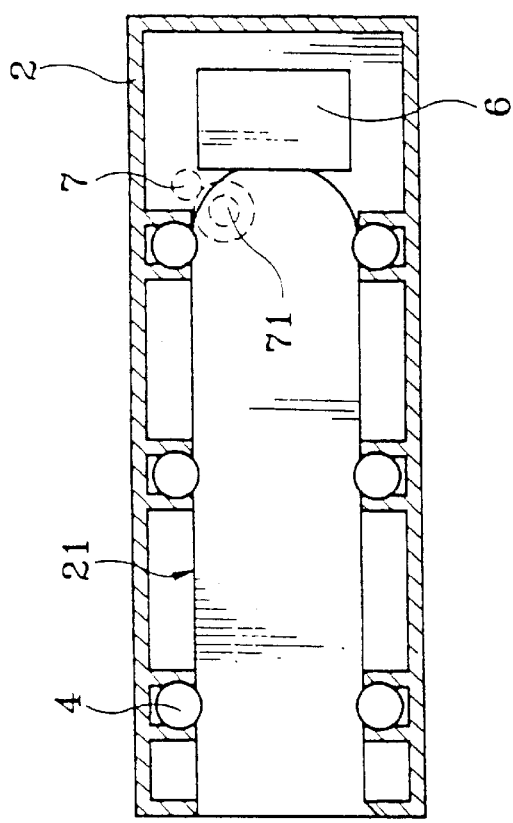
Figures 1, 4:
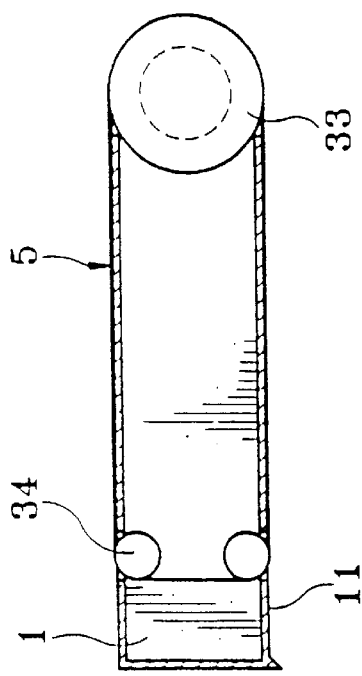
Figures 3, 4:
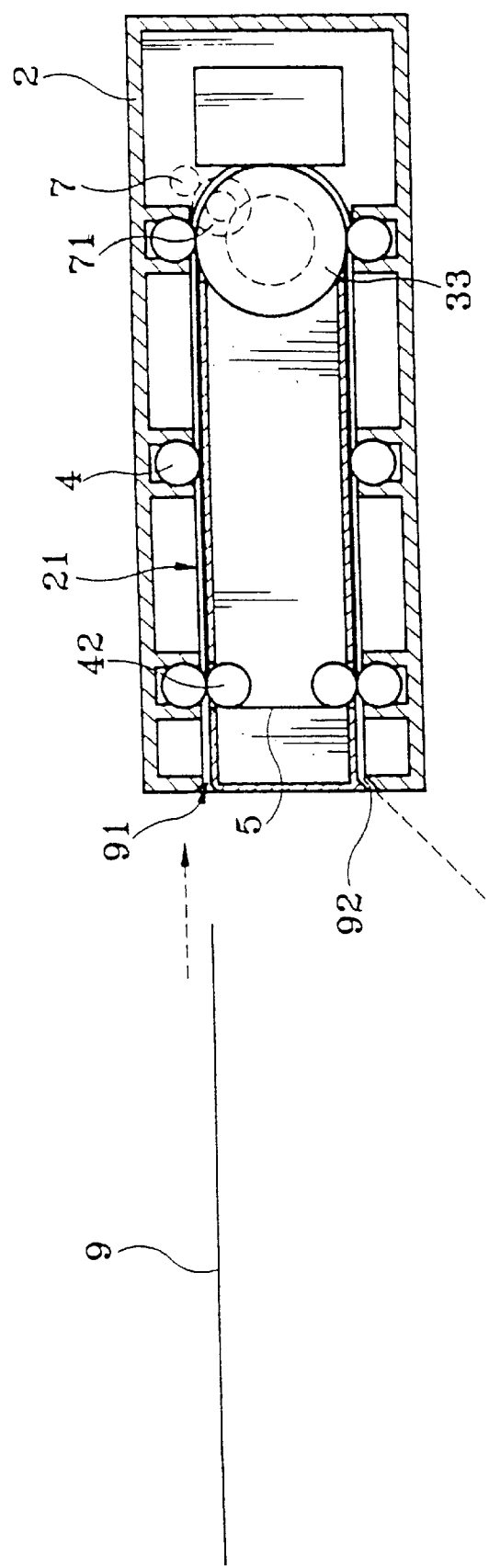

Please refer to FIGS. 2-3 and 2-4 which are the cross-section views of the assembled built-in scanner and the document sheet entrance of the first embodiment, respectively. When the transport portion 1 and the case 2 are tightly engaged, a document-feed channel 90, an entrance 91, and an exit 92 of a document sheet 9 are consequently formed. The opening of the entrance 91 is outwardly increased facilitating the feeding of the document sheet 9. When the document sheet 9 is fed through the entrance 91, the first rolling devices 3 and the driven rollers 4 respectively contact both surfaces of the document sheet 9 tightly. The first rolling devices 3 transport the document sheet 9 into the upper channel of the document-feed channel 90. When the document sheet 9 is fed through the CIS 6, the CIS 6 contacts the document sheet 9 and captures the image of the document sheet 9. Then, the document sheet 9 is fed through the lower channel of the document-feed channel 90 and the exit 92.

With the above built-in scanner of the invention, the document sheet is smoothly and one-way fed through the document-feed channel without vibration, hence the scanning quality is good. In addition, if many document sheets are needed to be scanned, these document sheets can be fed into the above built-in scanner of the invention one by one. Consequently, the throughput of the above built-in scanner of the invention is high.

The Second Embodiment

Please refer to FIG. 3-1, which is the cross-section view of a transport portion of the second embodiment according to the invention. The transport portion 1 includes a framework 11, a scan unit, a second rolling device 31, a plurality of third rolling devices 32, and a driving means 7. The framework 11 has some openings at its top, bottom, and right sides. The second rolling device 31 locates at the right side of the transport portion 1, and large part of the second rolling device 31 is beetled from the right-side opening of the framework 11. The third rolling devices locate at the top and bottom sides of the transport portion 1, and parts of the third rolling devices 32 are beetled from the topside and bottom-side openings of the framework 11. A belt 5 connects and rotates the axles of the second rolling device 31 and the third rolling devices 32 for transporting document sheets. The scan unit is located inside the transport portion 1, and it comprises a charge coupled device (CCD) 61, a lens 62, a mirror 63, and a light source 64. The driving means 7 locates in the transport portion 1 to drive one of the third rolling devices 32 directly.

Please refer to FIG. 3-2, which is the cross-section view of the case of the second embodiment according to the invention. The case 2 comprises a light source 64' and a guide part 21. Inside the case 2, there are an inner space and an opening to engage with the transport portion 1. In the guide part 21, there is a plurality of driven rollers 4. Parts of the driven rollers 4 are beetled to the inner space of the case 2. The light of the light source 64' is used for scanning a transparent document sheet.

Please refer to FIG. 3-3, which is the cross-section view of the assembled built-in scanner of the second embodiment. When the transport portion 1 and the case 2 are tightly engaged, a document-feed channel 90, an entrance 91, and an exit 92 of a document sheet 9 are consequently formed. The opening of the entrance 91 is outwardly increased for facilitating the feeding of the document sheet 9. When the document sheet 9 is fed through the entrance 91, the light source 64 illuminates the document sheet 9, the image of the document sheet 9 reflected by the mirror 63 will go through the lens 62 and then be focused into the CCD 61. If the document sheet is transparent, it is illuminated by the light source 64', and then the image of the document sheet 9 reflected by the mirror 63 will go through the lens 62 and then be focused into the CCD 61. The third rolling devices 32 transport the document sheet 9 into the upper channel of the document-feed channel 90, and then the document sheet 9 is fed through the lower channel of the document-feed channel 90 and the exit 92 by the second rolling device 31 and the third rolling devices 32.

With the above built-in scanner of the invention, the document sheet is smoothly and one-way fed through the document-feed channel without vibration, hence the scanning quality is good. In addition, if many document sheets are needed to be scanned, these document sheets can be fed into the above built-in scanner of the invention one by one. Consequently, the throughput of the above built-in scanner of the invention is high.

The Third Embodiment

Please refer to FIG. 4-1, which is the cross-section view of the transport portion of the third embodiment according to the invention. The transport portion 1 includes a framework 11, a forth rolling device 33, and a plurality of fifth rolling devices 34. The framework 11 has some openings at its top, bottom, and right sides, and parts of the fifth rolling devices 34 are beetled from the top-side and bottom-side openings of the framework 11. In addition, the forth rolling device 33 is beetled from the right-side opening of the framework 11. A belt 5 directly connects and rotates the forth rolling device 33 and the fifth rolling devices 34 for transporting document sheets. The belt 5 is made of a soft material with low tractability such as rubber.

Please refer to FIG. 4-2, which is the cross-section view of the case of the third embodiment. The case 2 includes a scan unit and a guide part 21. Inside the case 2, there are an inner space and an opening for engaging with the transport portion 1. The scan unit is used to capture the image of a document sheet. In this embodiment, the scan unit is a contact image sensor (CIS) 6. The guide part 21 comprises a driving means 7, a plurality of driven rollers 4, and a driving wheel 71. Parts of the driven rollers 4 are beetled to the inner space of the case 2. The driving means 7 is used to drive the driving wheels 71, and the driving wheel 71 is used to rotate the forth rolling device 33 of the transport portion 1.

Please refer to FIG. 4-3, which is the cross-section view of the assembled built-in scanner of the third embodiment. When the transport portion 1 and the case 2 are tightly engaged, a document-feed channel 90, an entrance 91, and an exit 92 of a document sheet 9 are consequently formed. The opening of the entrance 91 is outwardly increased facilitating the feeding of the document sheet 9. When the document sheet 9 is fed through the entrance 91, the belt 5 and the driven rollers 4 respectively contact both surfaces of the document sheet 9 tightly. The belt 5 transports the document sheet 9 into the upper channel of the document-feed channel 90. When the document sheet 9 is fed through the CIS 6, the CIS 6 contacts the document sheet 9 and captures the image of the document sheet 9. Then, the document sheet 9 is fed through the lower channel of the document-feed channel 90 and the exit 92.

With the above built-in scanner of the invention, the document sheet is smoothly and fed in a way along the document-feed channel without vibration, hence the scanning quality is good. In addition, if many document sheets are needed to be scanned, these document sheets can be fed into the above built-in scanner of the invention one by one. Consequently, the throughput of the above built-in scanner of the invention is high.

An Embodiment of the Belt

Figures 2, 5:
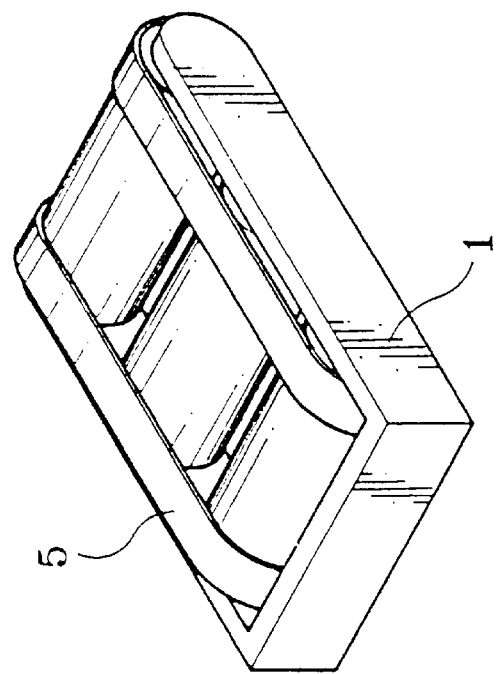
Figures 1, 5:
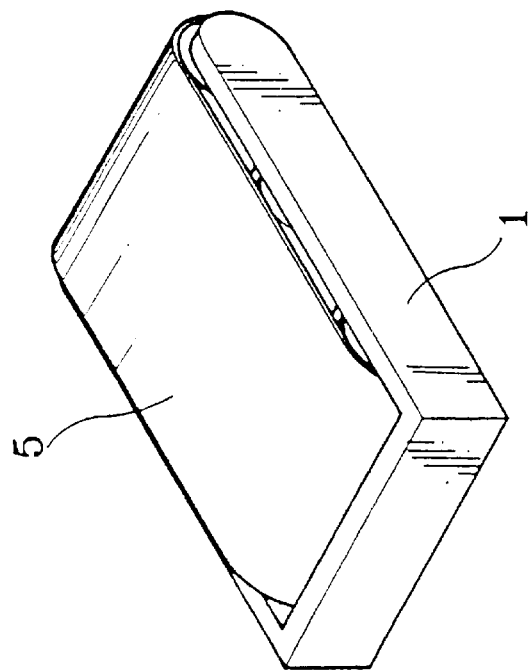

Please refer to FIG. 5-1, which is the perspective view of an embodiment of the belt according to the invention. The belt 5 covers all rollers of the transport portion 1 and the outer surface of the belt 5 directly contacts the document sheet 9. The scanning quality of the CIS is consequently better since the CIS 6 contacts the document sheet 9 much tighter and smoother.

Another Embodiment of the Belt

Please refer to FIG. 5-2, which is the perspective view of another embodiment of the belt according to the invention. The number of the belts 5 is two. The belts 5 cover both ends of all rollers of the transport portion 1 and the outer surface of the belts 5 just contact two side edges of the document sheet 9. The outer surface of the document sheet 9 will not be damaged by the belts 5.

An Embodiment of the Exit

Figures 2, 6:
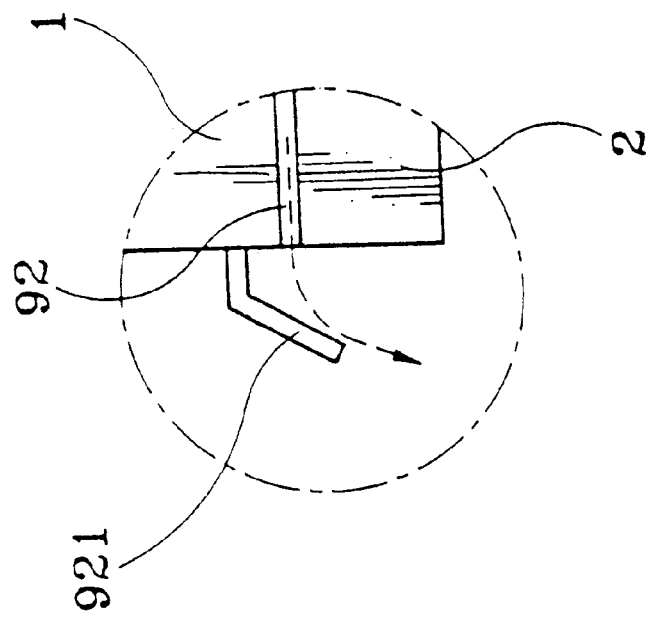
Figures 1, 6:
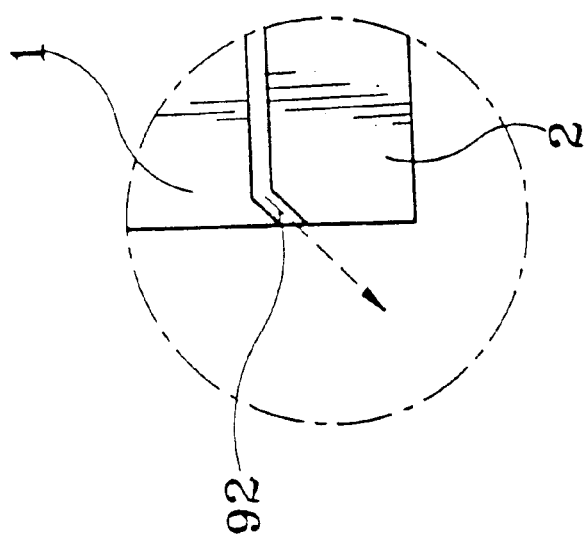

Please refer to FIG. 6-1, which is the cross-section view of an embodiment of the exit according to the invention. The exit 92 is formed by engaging the transport portion 1 and the case 2, and the exit 92 inclines down to facilitate the feeding of the document sheet 9 out. In addition, the shape difference of the entrance 91 and exit 92 can avoid users' misapplication.

Another Embodiment of the Exit

Please refer to FIG. 6-2, which is the cross-section view of another embodiment of the exit according to the invention. The exit 92 is formed by engaging the transport portion 1 and the case 2, and there is a skirt-like salient 921 near the exit 92 curved down to facilitate the feeding of the document sheet 9 out. In addition, the shape difference of the entrance 91 and exit 92 can avoid users' misapplication.

It is noted that the built-in scanner for computers described above are the preferred embodiments of the present invention for the purposes of illustration only, and are not intended as a definition of the limits and scope of the invention disclosed. Any modifications and variations that may be apparent to a person skilled in the art are intended to be included within the scope of the present invention.

What is claimed is:

1. A built-in scanner of computers for scanning opaque document sheets, comprising:
   a case, built inside a computer, having a space for containing an opaque document sheet, having a plurality of driven rollers furnished on the boundary of the space for feeding the nontransparent document sheet along the boundary in one way;
   a scan unit, capturing the image of the opaque document sheet and transferring it to electric signals;
   a transport portion, being engaged with or separated from the case, having a plurality of rolling devices rotated synchronously in a direction; an entrance and an exit of the opaque document sheet being formed between the transport portion and the boundary of the case; the driven roller contacting and being synchronously rotated by the rolling devices for feeding the opaque document sheet to be scanned by the scan unit; and
   driving means for rotating the rolling devices.

2. The built-in scanner of computers for scanning opaque document sheets according to claim 1, wherein the scan unit is mounted in the case to scan the image of the opaque document sheet.

3. The built-in scanner of computers for scanning opaque document sheets according to claim 2, wherein the scan unit comprises a light source for illuminating the opaque document sheet and a contact image sensor for transferring the reflected image of the opaque document sheet to electric signals.

4. The built-in scanner of computers for scanning opaque document sheets according to claim 1, wherein the scan unit is mounted in the transport portion to scan the image of the opaque document sheet.

5. The built-in scanner of computers for scanning opaque document sheets according to claim 4, wherein the scan unit includes a light source for illuminating the opaque document sheet; a charge couple device for transferring the reflected image of the opaque document sheet to electric signals; a lens for focusing the reflected image of the opaque document sheet into the charge couple device; and a mirror for reflecting the reflected image of the opaque document sheet to the lens.

6. The built-in scanner of computers for scanning opaque document sheets according to claim 1, wherein the rolling devices of the transport portion are rollers.

7. The built-in scanner of computers for scanning opaque document sheets according to claim 6, wherein the rolling devices are linked and synchronously rotated by a belt.

8. The built-in scanner of computers for scanning opaque document sheets according to claim 7, wherein the width of the belt and the length of the rolling devices are equal, and the belt is transparent and around the rolling devices.

9. The built-in scanner of computers for scanning opaque document sheets according to claim 6, wherein the rolling devices are linked and synchronously rotated by two belts which are around both ends of the rolling devices and contact only two parallel side edges of the opaque document sheet.

10. The built-in scanner of computers for scanning opaque document sheets according to claim 1, wherein the opening of the entrance is outwardly increased to facilitate the inserting of the opaque document sheet.

11. The built-in scanner of computers for scanning opaque document sheets according to claim 1, wherein the opening of the exit is inclined downward to avoid misapplication.

12. A built-in scanner of computers for scanning transparent document sheets, comprising:
    a case, built in a computer, having a space to contain a transparent document sheet, having a plurality of driven rollers furnished on the boundary of the space for feeding the nontransparent document sheet along the boundary in a way;
    a scan unit, capturing the image of the transparent document sheet and transferring it to electric signals;
    a transport portion, being engaged with or separated from the case, having a plurality of rolling devices rotated synchronously in a direction; an entrance and an exit of the transparent document sheet being formed between the transport portion and the boundary of the case; the driven roller contacting and being synchronously rotated by the rolling devices for feeding the transparent document sheet to be scanned by the scan unit; and
    driving means for rotating the rolling devices.

13. The built-in scanner of computers for scanning transparent document sheets according to claim 12, wherein the scan unit comprises a light source furnished on the case for illuminating the transparent document sheet; a charge couple device for transferring the permeative image of the transparent document sheet to electric signals; a lens for focusing the permeative image of the transparent document sheet into the charge couple device; and a mirror for reflecting the permeative image of the transparent document sheet into the lens.

14. The built-in scanner of computers for scanning transparent document sheets according to claim 12, wherein the rolling devices of the transport portion are rollers.

15. The built-in scanner of computers for scanning transparent document sheets according to claim 14, wherein the rolling devices are linked and synchronously rotated by a belt.

16. The built-in scanner of computers for scanning transparent document sheets according to claim 15, wherein the width of the belt and the length of the rolling devices are equal, and the belt is transparent and around the rolling devices.

17. The built-in scanner of computers for scanning transparent document sheets according to claim 14, wherein the rolling devices are linked and synchronously rotated by two belts which are around both ends of the rolling devices and contact only two parallel side edges of the transparent document sheet.

18. The built-in scanner of computers for scanning transparent document sheets according to claim 12, wherein the opening of the entrance is outwardly increased to facilitate the inserting of the transparent document sheet.

19. The built-in scanner of computers for scanning transparent document sheets according to claim 12, wherein the opening of the exit is inclined downward to avoid misapplication.

\* \* \* \* \*